United States Patent [19]
Gianchandai et al.

[11] Patent Number: 5,859,130
[45] Date of Patent: Jan. 12, 1999

[54] COMPOSITIONS WHICH CONTAIN POLYPHENYLENE ETHER AND POLYAMIDE RESIN

[75] Inventors: Jay K. Gianchandai, deceased, late of Loudonville, N.Y., by Hardevi Gianchandai, executor; Alexandros Hasson, Delmar, N.Y.; Ronald J. Wroczynski, Schenectady, N.Y.; John B. Yates, III, Glenmont, N.Y.

[73] Assignee: General Electric Co., Pittsfield, Mass.

[21] Appl. No.: 903,265

[22] Filed: Jul. 25, 1997

Related U.S. Application Data

[60] Continuation of Ser. No. 656,102, May 31, 1996, abandoned, which is a division of Ser. No. 526,654, Sep. 11, 1995, abandoned, which is a continuation of Ser. No. 153,833, Nov. 17, 1993, abandoned, which is a continuation of Ser. No. 815,476, Dec. 31, 1991, abandoned.

[51] Int. Cl.$^6$ .............. C08L 71/12; C08L 77/00; C08L 53/00

[52] U.S. Cl. .............. 525/89; 525/92 B; 525/92 D

[58] Field of Search .............. 525/89, 92 B, 525/92 D

[56] References Cited

U.S. PATENT DOCUMENTS

| | | | |
|---|---|---|---|
| 3,281,383 | 10/1966 | Zelinski et al. | 525/122 |
| 3,639,517 | 2/1972 | Kitchen et al. | 525/153 |
| 4,091,053 | 5/1978 | Kitchen | 525/98 |
| 4,097,550 | 6/1978 | Haaf et al. | 523/400 |
| 4,113,800 | 9/1978 | Lee, Jr. | 525/89 |
| 4,267,284 | 5/1981 | Kitchen | 525/99 |
| 4,315,086 | 2/1982 | Ueno et al. | 525/391 |
| 4,600,741 | 7/1986 | Aycock | 525/92 D |
| 4,647,621 | 3/1987 | Pohrt et al. | 525/71 |
| 4,732,928 | 3/1988 | Mizushiro et al. | 524/505 |
| 4,732,937 | 3/1988 | Sybert | 525/397 |
| 4,755,566 | 7/1988 | Yates | 525/391 |
| 4,772,657 | 9/1988 | Akiyama et al. | 524/504 |
| 4,772,664 | 9/1988 | Ueda | 525/92 D |
| 5,010,144 | 4/1991 | Phansteil et al. | 525/397 |
| 5,041,504 | 8/1991 | Brown et al. | 525/397 |
| 5,237,006 | 8/1993 | Yates, III et al. | 525/397 |

FOREIGN PATENT DOCUMENTS

| | | |
|---|---|---|
| 1176391 | 10/1984 | Canada . |
| A-0 225 170 | 6/1987 | European Pat. Off. . |
| 0347828 | 12/1989 | European Pat. Off. . |
| A-0 395 994 | 11/1990 | European Pat. Off. . |
| A-0 440-939 | 8/1991 | European Pat. Off. . |
| WO-A-8 602 086 | 4/1986 | WIPO . |
| WO-A-8 806 173 | 8/1988 | WIPO . |

*Primary Examiner*—David Buttner

[57] ABSTRACT

Improved thermoplastic compositions based on compatibilized blends of polyphenylene ether and polyamide are disclosed. These compositions contain radial block copolymers (such as those based on styrene/butadiene) having at least three polymer chains which often terminate with non-elastomeric segments.

11 Claims, No Drawings

COMPOSITIONS WHICH CONTAIN POLYPHENYLENE ETHER AND POLYAMIDE RESIN

This is a continuation of application. Ser. No. 08/656,102 filed on May 31, 1996 now abandoned, which is a divisional application of Ser. No. 08/526,654 (now abandoned) filed Sep. 11, 1995, which is a continuation application of Ser. No. 08/153,833 (now abandoned) filed on Nov. 17, 1993, which is a continuation of Ser. No. 07/815,476 (now abandoned) filed on Dec. 31, 1991.

This invention relates generally to thermoplastic compositions, and more particularly, to new blends of polyphenylene ether and polyamide resin which have a wide variety of excellent properties.

Polyphenylene ether resins (sometimes referred to as "PPE" or as "polyphenylene oxide") are a widely used class of thermoplastic engineering resins. Part of their popularity stems from the fact that they exhibit excellent tensile strength, hydrolytic stability, and dielectric properties. They also usually exhibit good impact strength when blended with rubber-containing materials such as high impact polystyrene or various styrene/butadiene block copolymers. Furthermore, under most circumstances, they are resistant to high temperatures.

In order to improve the solvent resistance of PPE resins, they are sometimes blended with other resins which have a fairly high degree of crystallinity, such as polyamides. Compatibilized PPE-polyamide compositions exhibit very good solvent resistance, while retaining the other physical properties mentioned above. Moreover, PPE-polyamide compositions are usually amenable to many different types of processing operations, such as extrusion, compression molding, and injection molding. Examples of molded parts prepared from these compositions are housings and other components used to make lawn-care equipment; as well as automotive parts such as doors and fenders.

As the variety of uses for PPE-polyamide resins continues to increase, even more stringent requirements are coming into existence, in terms of final properties. As an example, impact strength-values must be increased for many end uses. Furthermore, high-speed molding operations require resin blends which must exhibit ever-increasing degrees of melt flow. An additional difficulty arises from the fact that these improvements must be made while other important properties are substantially maintained, such as tensile strength, heat resistance, and elongation characteristics.

It is therefore apparent that a need exists for compatibilized PPE-polyamide compositions which exhibit excellent impact strength and melt flow characteristics, while substantially retaining other important properties, such as tensile strength, chemical resistance, and heat resistance.

SUMMARY OF THE INVENTION

The requirements set forth above have been satisfied by the discovery of an improved composition which comprises:
a) polyphenylene ether resin;
b) polyamide resin;
c) an effective amount of a compatibilizing agent for components (a) and (b); and
d) a radial block copolymer which comprises about 60% to about 95% by weight polymerized vinyl aromatic material, and about 40% to about 5% by weight polymerized conjugated diene monomer, said copolymer having at least three polymer chains which form the radial configuration.

The composition can also include other elastomeric materials, such as di- and triblock copolymers or certain radial teleblock copolymers. As described below, various other components may also be present in these compositions.

DETAILED DESCRIPTION OF THE INVENTION

PPE resins suitable for use as component (a) of the present invention are generally known in the art. Many of them are described in U.S. Pat. Nos. 3,306,874; 3,306,875; and 3,432,469 of Allan Hay; U.S. Pat. Nos. 3,257,357 and 3,257,358 of Gelu Stamatoff; U.S. Pat. No. 4,806,602 of Dwain M. White et al.; and U.S. Pat. No. 4,806,297 of Sterling B. Brown et al., all incorporated herein by reference. Both homopolymer and copolymer polyphenylene ethers are within the scope of this invention.

The preferred PPE resins are homo- and copolymers which comprise a plurality of structural units of the formula

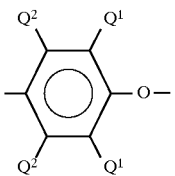

wherein each $Q^1$ is independently halogen, primary or secondary lower alkyl, phenyl, haloalkyl, aminoalkyl, hydrocarbonoxy, or halohydro-carbonoxy, wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl, and the corresponding heptyl groups. Examples of secondary lower alkyl groups are isopropyl, sec-butyl and 3-pentyl. Preferably, any alkyl radicals are straight chain, rather than branched. Most often, each $Q^1$ is alkyl or phenyl, especially $C_{1-4}$ alkyl, and each $Q^2$ is hydrogen. Especially preferred polyphenylene ethers will be comprised of units derived from 2,6-dimethyl phenol. Also preferred in some instances are PPE copolymers comprised of units derived from 2,6-dimethyl phenol and 2,3,6-trimethyl phenol.

This invention also includes within its scope PPE resins which contain certain moieties which modify properties such as molecular weight, melt viscosity, or impact strength. For example, vinyl monomers and vinyl aromatic compounds may be grafted onto the PPE polymer, as described, for example, in the application of Sterling B. Brown et al., Attorney Docket Number RD-19372, U.S. Ser. No. 351,903, filed May 15, 1989, the entire contents of which are incorporated herein by reference now U.S. Pat. No. 5,089,566.

As another example, coupled PPE polymers may also be used, in which the coupling agent is reacted with hydroxy groups of two PPE chains to produce a higher molecular weight polymer.

The PPE resins of this invention generally have a weight average molecular weight of about 20,000 to 80,000, as determined by gel permeation chromatography.

Furthermore, they can be prepared by methods known in the art: for example, oxidative coupling of an appropriate monohydroxyaromatic compound in the presence of a catalyst based on copper, manganese, or cobalt.

The polyamides used for the present invention are generally well-known in the art; some are often alternatively referred to as "nylons". Many are described in U.S. Pat. Nos. 4,873,276; 4,970,272; 4,997,612; and 5,000,897; all incorporated herein by reference. The polyamides can be prepared by any known method, such as the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups an a dicarboxylic acid, or a monoaminocarboxylic acid or a lactam thereof as defined above, together with substantially equimolar proportions of a diamine and a dicarboxylic acid. The dicarboxylic acid may be used in the form of a functional derivative thereof, for example, an ester or an acid chloride. In addition to the patents mentioned above, polyamides and their precursors are also described in the following U.S. patents, each of which is also incorporated herein by reference: U.S. Pat. Nos. 4,755,566.(Yates, III); 4,732,938 (Grant et al); 4,659,760 (van der Meer), and 4,315,086 (Ueno et al).

Specific examples of polyamides which are useful in the present invention are polyamide 6; polyamide 6,6; polyamide 11; polyamide 12; polyamide 6,3; polyamide 6,4; polyamide 4,6; polyamide 6/10; polyamide 6,12, as well as polyamides prepared from terephthalic acid and/or isophthalic acid and trimethylhexamethylenediamine; from adipic acid and m-xylylenediamines; from adipic acid, azelaic acid and 2,2 bis-(p-aminocyclohexyl)propane, and from terephthalic acid and 4,4-diaminodicyclohexylmethane.

Mixtures and/or copolymers of two or more of the foregoing polyamides or prepolymers thereof, respectively, are also within the scope of the present invention.

The polyamide used may also be one or more of those referred to as "toughened nylons", which are often prepared by blending one or more polyamides with one or more polymeric or copolymeric elastomeric toughening agents. Examples of these types of materials are given in U.S. Pat. Nos. 4,174,358; 4,474,927, 4,346,194; 4,251,644; 3,884,882; 4,147,740; all incorporated herein by reference, as well as in a publication by Gallucci et al, "Preparation and Reactions of Epoxy-Modified Polyethylene", J. APPL. POLY. SCI., V. 27, PP. 425–437 (1982).

A preferred polyamide in some embodiments of the present invention is one selected from the group consisting of polyamide 6; polyamide 6,6; polyamide 11; and polyamide 12; with polyamide 6,6 itself being especially preferred in some instances.

The weight ratio of PPE to polyamide may vary from about 20:80 to about 80:20, with a ratio in the range of about 70:30 to about 30:70 being preferred, and a ratio in the range of about 60:40 to about 40:60 being especially preferable in some embodiments.

Component (c) of this invention is a compound which improves the compatibility between the polyphenylene ether and polyamide resins. Improved compatibility is manifested by better processability, impact strength and/or elongation, or appearance, as compared to compositions without this component. These compounds are generally known in the art, and are usually either premixed with one of the base polymers or added separately to the composition at some point prior to or during blending.

Compatibilizing compounds suitable for use herein generally fall into the following categories:

(a) compounds which contain both (i) an ethylenic carbon-carbon double bond or a carbon-carbon triple bond and (ii) a carboxylic acid, acid anhydride, acid amide, imide, carboxylic ester, amine, or hydroxyl group;

(b) liquid diene polymers;

(c) epoxy compounds;

(d) polycarboxylic acids or derivatives thereof;

(e) an oxidized polyolefin wax;

(f) a compound containing an acyl functional group;

(g) a polyphenylene ether modified with a compound containing an acyl functional group;

(h) a compound containing an epoxytriazine group, or a polyphenylene ether modified with a compound containing an epoxytriazine group; and.

(i) trialkylamine salts or tri-(aryl-substituted alkyl)amine salts.

Examples of subclass (a) compatibilizers are provided in the Ueno et-al patent mentioned above, U.S. Pat. Nos. 4,315,086 and include, for example, maleic anhydride, maleic acid, fumaric acid, maleimide, maleic hydrazide, as well as reaction products of a diamine with these materials.

Examples of subclass (b) compatibilizers are also provided in the Ueno et al patent, and include, for example homopolymers of a conjugated diene and copolymers of the conjugated diene and at least one member selected from the group consisting of other conjugated dienes, olefins, aromatic vinyl compounds, and acetylenic compounds. Specific examples include homopolymers of butadiene or of isoprene.

The epoxy compounds of subclass (c) include, for example, epoxy resins produced by condensing polyhydric phenols and epichlorohydrin in different proportions, as well as glycidyletherified products of monohydric phenols or monohydric alcohols. Ueno et al provides further examples of these types of materials.

In regard to subclass (d), the polycarboxylic acid or derivative thereof which is suitable for this invention is usually one represented by the formula

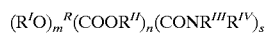

$(R'O)_m R (COOR'')_n (CONR''' R^{IV})_s$ or derivatives thereof wherein R is a linear or branched chain, saturated aliphatic hydrocarbon of from 2 to 20 carbon atoms; $R'$ is selected from the group consisting of hydrogen or an alkyl, aryl, acyl or carbonyl dioxy group of from 1 to 10 carbon atoms; each $R''$ is independently selected from the group consisting of hydrogen or an alkyl or aryl group of from 1 to 20 carbon atoms; each $R'''$ and $R^{IV}$ is independently selected from the group consisting of hydrogen or an alkyl or aryl group of from 1 to 10 carbon atoms; m is equal to 1 and (n+s) is greater than or equal to 2, and n and s are each greater than or equal to 0; and wherein ($OR'$) is alpha or beta to a carbonyl group, and at least 2 carbonyl groups are separated by 2 to 6 carbon atoms.

Preferred compounds of this type are citric acid, malic acid, agaricic acid, and salts and hydrates thereof, as described in U.S. Pat. No. 4,873,286 of Gallucci et al, the contents of which are incorporated herein by reference.

Acid esters, e.g., those derived from polycarboxylic acids, may also be used in this invention. Examples are acetyl citrate and mono- and distearyl citrates.

Acid amines may also be used, such as N,N'-diethyl citric acidamide.

Examples of suitable derivatives of the polycarboxylic acid are the salts thereof, including the salts with amines and, preferably, the alkali and alkaline metal salts. Illustrative salts include calcium malate, calcium citrate, potassium malate, and potassium citrate. The above-referenced Gallucci et al patent, U.S. Pat. No. 4,873,286, describes many of these compounds.

Examples of subclass (e) are found in U.S. Pat. No. 4,659,760, issued to R. van der Meer, and incorporated herein by reference. One example is an oxidized polyethylene wax. Organic phosphites are sometimes used in conjunction with the wax.

Examples of subclass (f) are compounds described in U.S. Pat. Nos. 4,642,358 and 4,600,741, issued to D. Aycock et al, each of which is incorporated herein by reference. Nonlimiting examples include chloroformylsuccinic anhydride, chloroethanoylsuccinic anhydride, trimellitic anhydride acid chloride, 1-acetoxy acetyl-3,4-dibenzoicacid anhydride, and terephthalic acid acid chloride (i.e., the mono-acid chloride of terephthalic acid).

Examples of subclass (g) are also found in the Aycock et al patents mentioned above, and include the acyl functional-type compounds mentioned above which have been reacted with a portion of a PPE resin.

Examples of subclass (h) are the chloroepoxytriazine compounds described in U.S. Pat. No. 4,895,945, of S. B. Brown et al, the contents being incorporated herein by reference. Furthermore, the applications corresponding to Ser. Nos. 07/351,903 (filed May 15, 1989) now U.S. Pat No. 5,089,566 and 07/351,905 (filed May 15, 1989) now U.S. Pat. No. 5,096,979 are generally relevant to these types of materials, and are therefore also incorporated herein by reference. These references also describe methods for preparing and using these compounds.

Furthermore, U.S. Pat. No. 5,041,504, issued to S. B. Brown et al (and also incorporated herein by reference), describes compatibilized polyphenylene ether-polyamide copolymers prepared using epoxytriazine compounds, such as 2-chloro-4,6-diglycidoxy-1,3,5-triazine (DGCC); 2-chloro-4-(n-butoxy)-6-glycidoxy-1,3,5-triazine (BGCC); and 2-chloro-4-(2,4,6-trimethylphenoxy)-6-glycidoxy-1,3,5-triazine (MGCC).

Examples of the compatibilizers of subclass (i) are the trialkylamine salt materials described in U.S. Pat. Nos. 4,755,566 and 4,889,889, (J. B. Yates, III), each of which is incorporated herein by reference. These patents also teach the use of such compounds in preparing compatibilized PPE-polyamide materials. Salts of maleic or fumaric acid are usually preferred. Trialkylammonium maleates or trialkylammonium fumarates are particularly preferred, such as triethylammonium fumarate and tri-n-butylammonium fumarate; although triaryl salts such as tribenzylammonium fumarate are also sometimes preferred for certain embodiments.

Component (d) of the present invention is a vinyl aromatic-based radial block copolymer. Copolymers of this type which are suitable for the present invention comprise about 60% to about 95% by weight polymerized vinyl aromatic material, and about 40% to about 5% by weight polymerized conjugated diene monomer. The copolymer has at least three polymer chains which form the radial configuration. Each chain usually terminates with a substantially non-elastomeric segment, to which an elastomeric polymer segment is joined. They are sometimes referred to as "polymodal branched block copolymers".

Because of their relatively low rubber content, these types of radial block copolymers do not primarily function as impact modifiers in the compositions described herein. Instead, they function as additives which, surprisingly, enhance melt flow without substantially detracting from the excellent low temperature impact strength and ductility provided for by the overall polymer system.

Some examples of radial block copolymers which are suitable for the present invention are described in U.S. Pat. No. 3,639,517 of A. G. Kitchen et al, the contents of which are incorporated herein by reference, and in the application corresponding to Ser. No. 590,199, filed on Sep. 28, 1990 for J. Yates III and A. Hasson, which is also incorporated herein by reference. The copolymers are sometimes referred to as rigid "star polymers", as described by A. Noshay and J. McGrath in *Block Copolymers—Overview and Critical Survey,* Academic Press, Inc. (1977). Commercial examples of these materials are markete under the tradename "K-Resin" by Phillips Petroleum, e.g., grades KR01 KR03, KR04, KR05, and KR10. The radial block copolymers usually have a melt flow in the range of about 0.5 to about 20, as determined by ASTM D-1238-65T, condition G, as referenced in U.S. Pat. No. 3,639,517. K-Resins are also described in *K-Resin/BDS Polymer: A New Clear-Impact Resistant Polystyrene,* L. M. Fodor, A. G. Kitchen, C. C. Biard, Am. Chem. Soc., Div. Org. Coat. Plast. Chem., Preprints, 34(1), 130 (1974).

In preferred embodiments, the radial block copolymer comprises about 60% to about 95% by weight polymerized vinyl aromatic material, and about 40% to about 5% polymerized conjugated diene monomer. In more preferred embodiments, the copolymer comprises about 70% to about 95% by weight polymerized vinyl aromatic material, and about 30% to about 5% polymerized conjugated diene monomer.

The polymerized vinyl aromatic material for the radial copolymer is usually derived from a monomer selected from the group consisting of styrene, chlorostyrene, vinyl toluene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl) styrene, 1-vinylnaphthalene, 2-vinylnaphthalene, mixtures of any of these monomers, and copolymers formed from any combination of these monomers.

In preferred embodiments, the vinyl aromatic material is one derived from either homostyrene, para-methylstyrene, or t-butylstyrene, with homostyrene (i.e., as polymerized into homopolystyrene) being most preferred for many embodiments.

The polymerized conjugated diene monomer is usually derived from one or more of the following monomers: 1,3-butadiene, isoprene, 2,3-dimethyl-1,3-butadiene, piperylene, 3-butyl-1,3-octadiene, and phenyl-1,3-butadiene. Of this group, 1,3-butadiene, isoprene, or mixtures of these two are preferred, with 1,3-butadiene itself being most preferred.

The amount of radial block copolymer present in the composition depends on at least several variables, such as the particular vinyl aromatic and diene materials employed, as well as the level of low-temperature impact strength and ductility desired for an article formed from these compositions. Usually, about 1% by weight to about 30% by weight radial block copolymer is present, based on the weight of the entire composition. In more preferred embodiments, about 5% by weight to about 25% by weight is present, while in most preferred embodiments, about 10% by weight to about 20% by weight is present.

Methods for preparing the radial block copolymers are familiar to those skilled in the art, and are also described in some of the references mentioned herein, such as U.S. Pat. No. 3,639,517. Often, a sequential polymerization of the vinyl aromatic material and the conjugated diene monomer is carried out. Multiple additions of the vinyl aromatic material in the presence of an initiator produce the non-elastomeric segments, followed by the addition and polymerization of the diene to form the elastomeric block. A treating agent, having at least two functional groups (preferably three groups) attached thereto, is then added to form branching, i.e., the chain formation which characterizes these radial block copolymers. A suitable example of such a treating agent is a polyepoxide compound. Polymerization is usually carried out at temperatures of less than about 250° F. (121° C.), and recovery of the polymer can be accomplished by several appropriate techniques, such as solvent precipitation.

No special procedures are required for incorporating the radial block copolymer into the overall composition. Dry-blending individually with the PPE or with the polyamide is possible, as is the addition of the radial block copolymer to a pre-blend of the PPE and the polyamide.

In some embodiments, compositions of the present invention are further enhanced by the inclusion of an elastomeric material, such as elastomeric block copolymers and mixtures thereof. They are usually used at levels ranging from about 1% by weight to about 30% by weight, based on the weight of the entire composition, as further described below.

Examples of suitable materials include various diblock or triblock copolymers characterized by an A—B, A—B—A', or $(A—B)_m^{-X}$ structure, or mixtures of these structures, wherein A and A' are each polymerized vinyl aromatic hydrocarbon blocks, each B is derived from at least one polymerized conjugated diene, X is the radical of a multi-functional coupling agent, and m is an integer of at least 2. These types of materials are well-known in the art, and frequently comprise blocks of polystyrene and either polyisoprene or polybutadiene. The polybutadiene or polyisoprene may be completely-, partially-, or non-hydrogenated. Some examples of suitable block copolymers are provided in U. K. Pat. No. 1,264,741, and in U.S. Pat. Nos. 3,078,254; 3,149,182; 3,231,635; 3,265,765; 3,287,333; 3,297,793; 3,462,162; 3,594,452; 3,595,942; 3,694,523; 3,842,029; 4,402,159; 4,755,566; 4,874,810; 4,889,889; 4,900,786; and 4,935,472; all of which are incorporated herein by reference.

Some specific examples of block copolymers are: polystyrene-polybutadiene; polystyrene-polyisoprene; polystyrene-polybutadiene-polystyrene; and polystyrene-polyisoprene-polystyrene. As mentioned above, hydrogenated versions of these materials are also possible, e.g., styrene-(ethylene-butylene)-styrene block copolymers, styrene-ethylene-propylene block copolymers, and the like. In some embodiments, the polystyrene-polybutadiene-polystyrene block copolymers are most preferred.

In some embodiments of the present invention, a radial teleblock copolymer can also be present. These materials often contain segments or "blocks" which themselves comprise a conjugated diene polymer, vinyl aromatic polymer blocks, and a coupling agent, and are sometimes referred to as "branched" polymers. They are well-known in the art. For example, they are generally described in U.S. Pat. No. 4,097,550; ADHESIVES AGE, Marrs et al, December, 1971, pp 15–20; and in RUBBER WORLD, Haws et al, January, 1973, pp 27–32, the patent and other disclosures being incorporated herein by reference. They are also described in a patent application assigned to the assignee of the present invention, Ser. No. 591,193, filed Sep. 28, 1990 for John B. Yates, III (Attorney Docket 8CN-8458), also incorporated herein by reference.

Usually, several chains of the diene polymer (often three or more) extend from a coupling agent, with each chain terminating at its other end with a block of the vinyl aromatic polymer.

Commercial examples of radial teleblock copolymers suitable for this invention are the FINAPRENE® products, Grades 401, 411, 414, 416, and 417, available from Fina Oil Company.

The amount of radial teleblock copolymer employed in compositions of the present invention depends on several factors, such as the particular vinyl aromatic polymer and conjugated diene employed, as well as the desired level of various properties (for example, impact strength) for end products. Usually, about 1% by weight to about 30% by weight is suitable, based on the weight of the entire composition. In more preferred embodiments, about 5% by weight to about 15% by weight is used, and in some especially preferred embodiments, about 8% by weight to about 18% by weight is present.

The compositions of this invention may also include one or more additives which impart or enhance a variety of characteristics which are sometimes desirable. Examples of such additives are flame retardants, plasticizers, stabilizers (e.g., heat-stabilizers and ultraviolet light stabilizers), antistatic agents, fillers, reinforcing agents, lubricants, colorants, dyes, pigments, and drip retardants. These additives are of course used in effective amounts, which usually range, for each, from about 0.1% by weight to about 50% by weight, based on the weight of the entire composition.

Preparation of the overall compositions described herein can be achieved by conventional procedures. For example, the ingredients can be combined by any technique which results in an intimate blend. These techniques often involve the use of an extruder, which provides a substantial shearing force to the composition. Extruders which permit the addition of all of the ingredients through one port may be employed, or alternatively, those which contain multiple ports may be used. For example, the PPE, radial block copolymer, compatibilizing agent, and any other ingredients may be added through the upstream port of a suitable extruder, while the polyamide is added through a downstream port. The extruder is sometimes vacuum-vented. Extrusion temperatures can be determined without undue experimentation by those skilled in processing thermoplastics. They are usually in the range of about 280° C. to about 350° C.

As mentioned above, the compositions of the present invention surprisingly exhibit an unusual combination of properties in melt form and in the form of molded articles. Some of these properties are high melt flow, excellent chemical resistance and tensile strength, and high impact strength, both at room temperature and at much lower temperatures. The examples which follow illustrate the characteristics of the present invention.

EXAMPLES

The following materials were used in these examples, unless otherwise indicated:

PPE (Component a): The base resin was poly(2,6-dimethyl-1,4-phenylene ether), having an intrinsic viscosity in chloroform at 25° C. of 0.46 dl./g.

POLYAMIDE (Component b): The polyamide employed was nylon 6,6.

COMPATIBILIZER (Component c): The compatibilizer for Example 1 was citric acid (mono hydrate). The compatibilizers for the other examples are indicated below.

RADIAL BLOCK COPOLYMER (Component d):
K-Resin®, grade KR-01, a styrene-butadiene copolymer commercially available from Phillips Petroleum Company, containing about 73% styrene and 27% butadiene.

K-Resins®, grade KR-04, a styrene-butadiene copolymer commercially available from Phillips Petroleum Company, containing about 73% styrene and 27% butadiene.

High Impact Polystyrene: Butadiene-modified homopolystyrene, having a rubber content of about 10.5% by weight.

BLOCK COPOLYMER: The impact modifier used in the samples was an unsaturated styrene-butadiene-styrene linear block copolymer, KRATON®D 1102.

The compositions were prepared by dry-blending and compounding the components, using a 30 mm Werner & Pfleiderer twin-screw extruder. The polyamide was added by way of a downstream port. Component levels are expressed in parts by weight (pbw), unless otherwise indicated.

The extrudate was quenched and pelletized, and the products were then molded into test specimens, using a Toshiba injection molding machine.

Example 1

The Base Composition for this example contained the following:

| | |
|---|---|
| PPE | 36 pbw |
| Polyamide | 39 pbw |
| KRATON ®D 1102 | 9 pbw |
| Citric Acid Monohydrate | 1 pbw |
| Heat Stabilizer | 0.3 pbw |
| Carbon Black (Monarch 800, from Cabot Corporation) | 0.5 pbw |

The remainder of the composition constituted either HIPS or the radial block copolymer of the present invention, as shown in the table. The compositions were prepared as described above. Tests on molded pieces (using conventional ASTM procedures) resulted in the properties also set forth in Table 1. The following tests were used, unless otherwise indicated:

| | |
|---|---|
| Izod Impact Strength | ASTM - D256 |
| Dynatup Impact Strength | ASTM - D3763–85 |
| Tensile Yield | ASTM - D638 |
| Tensile Elongation | ASTM - D638 |
| Tensile Break | ASTM - D638 |
| Heat Distortion Temperature | ASTM - D648 |
| Flexural Modulus | ASTM - D790 |
| Flexural Yield | ASTM - D790 |
| Flow - (see the table keys) | |

TABLE I

| | Sample Number | | |
|---|---|---|---|
| | 1* | 2 | 3 |
| BASE Composition (pbw) | 85.8 | 85.8 | 85.8 |
| Rubber Modified Polystyrene (HIPS) | 15.0 | — | — |
| Radial Block Copolymer (KR-01) | — | 15.0 | — |
| Radial Block Copolymer (KR-04) | — | — | 15.0 |
| PROPERTIES | | | |
| Izod Impact Strength (Notched) (ft-lb/in) | 3.4 | 8.6 | 9.2 |
| Dynatup Impact Strength (Room Temp.) (in-lbs) | 391 | 514 | 502 |
| Tensile Yield (Kpsi) | 8.25 | 8.40 | 8.02 |

TABLE I-continued

| | Sample Number | | |
|---|---|---|---|
| | 1* | 2 | 3 |
| Tensile Elongation (%) (at break) | 48.9 | 67.4 | 140.1 |
| Heat Distortion Temperature (°F.) | 306 | 304 | 300 |

*Comparative Sample

The data in Table 1 demonstrate that the use of the radial block copolymers of the present invention in place of HIPS results in large increases in Izod and Dynatup impact strength, as well as in elongation characteristics.

Example 2

In this example, the benefits of the disclosed compositions are demonstrated, using two other compatibilizing agents. The base composition was similar to that of Example 1, with minor changes, e.g., the omission of the heat stabilizer and the carbon black pigment. The compatibilizing agents employed were: anhydrous citric acid, at 0.6 pbw, and fumaric acid, at 0.4 pbw (molar amounts are substantially equivalent).

Samples 4 and 5 both utilized citric acid. Comparative sample 4 contained 15 pbw rubber-modified polystyrene (also known as high impact polystyrene—"HIPS"), while sample 5 of this invention contained K-Resin, grade 04 ("KR-04") in place of the HIPS, at the same level.

Samples 6 and 7 both utilized fumaric acid. Comparative sample 6 contained 15 pbw HIPS, while sample 7 of this invention contained KR-04 in place of HIPS, at the same level.

The compositions were prepared by dry-blending and compounding the components, using a 30 mm Werner & Pfleiderer twin-screw extruder. The polyamide was added by way of a downstream port. Component levels are expressed in parts by weight (pbw), unless otherwise indicated.

The extrudate was quenched and pelletized, and the products were then molded into test specimens, using a Toshiba injection molding machine.

Testing of the compositions was carried out as in Example 1; and the results are shown below in Table 2:

TABLE 2

|  | 4*<br>(HIPS/Citric) | 5<br>(KR-04)/Citric) | 6*<br>(HIPS/Fumaric) | 7<br>(KR-04/Fumaric) |
|---|---|---|---|---|
| PROPERTIES |  |  |  |  |
| Izod Impact Strength (Notched) (ft-lb/in) | 3.1 | 7.9 | 3.5 | 7.8 |
| Heat Distortion Temperature (66 psi) (°F.) | 314 | 322 | — | — |
| Dynatup Impact Strength[a] (ft-lbs) | 41<br>d | 42<br>d | 42<br>d | 47<br>d |
| Tensile Elongation (%) | 50 | 79 | 43 | 70 |
| Flexural Modulus (Kpsi) | 318 | 296 | 315 | 293 |
| Flexural Yield (Kpsi) | 12.7 | 12.1 | 12.6 | 11.9 |
| Tensile Yield (Kpsi) | 8.7 | 8.5 | 8.9 | 8.4 |
| Tensile Break | 7.8 | 7.6 | 8.0 | 7.5 |
| Flow (inches)[b] | 28.0 | 26.5 | 25.0 | 26.0 |

*Control
[a] = "d" ductile; measurement is at break-point
HIPS = High Impact Polystyrene
KR-04 = K-Resin ®, grade 04
[b]Flow = Length of melt flow in 0.250 × 0.125 inch channel, at 550° F. cylinder (set), 170° F. mold (set), and 10,000 psi into mold.

The data in Table 2 clearly demonstrate various beneficial aspects of the present invention. For example, Izod impact strength and tensile elongation values are greatly increased, regardless of the compatibilizing agent utilized.

The slight decrease in flexural modulus values is not deemed to be significant for most end uses, since the values are still very good.

Example 3

This example demonstrates the benefits of the present invention with various other compatibilizing agents. The base composition was similar to that of Example 2, and included the following:

PPE: 36 pbw of poly(2,6-dimethyl-1,4-phenylene ether), having an intrinsic viscosity in chloroform at 25° C. of 0.46 dl./g.

POLYAMIDE—39 pbw of nylon 6,6.

COMPATIBILIZER—The compatibilizers were as follows:

Samples 8 and 9: PPE modified with about 1–2% by weight of an acyl-functional compound ("Acyl" in table), as described in U.S. Pat. No. 4,600,741, mentioned-above, at a level of 18 pbw.

Samples 10 and 11: PPE modified with about 2% by weight of a chloroepoxytriazine ("Epoxy" in table) compound, as described in the above-mentioned U.S. Pat. Nos. 4,895,945 and 5,041,504, at a level of 18 pbw.

RADIAL BLOCK COPOLYMER

K-Resins®, grade KR-04, as described above, at a level of 15 pbw, when used.

HIPS: High Impact Polystyrene, at a level of 15 pbw, when used.

KRATON®D-1102: Triblock copolymer discussed above, at a level of 9 pbw.

The control samples, 8 and 10, utilized HIPS, while the examples of this invention, 9 and 11, utilized the K-Resin. The compositions were prepared as described above, and as taught in the referenced patents.

Testing of the compositions was carried out as in Example 2; and the results are shown below in Table 3:

TABLE 3

|  | 8*<br>(HIPS/Acyl) | 9<br>(KR-04/Acyl) | 10*<br>(HIPS/Epoxy) | 11<br>(KR-04/Epoxy) |
|---|---|---|---|---|
| PROPERTIES |  |  |  |  |
| Izod Impact Strength (Notched) (ft-lb/in) | 6.7 | 9.4 | 0.8 | 2.7 |
| Heat Distortion Temperature (66 psi) (°F.) | — | — | — | — |
| Dynatup Impact Strength[a] (ft-lbs) | 45<br>d | 47<br>d | 3<br>b | 23<br>ds |
| Tensile Elongation (%) | 41 | 65 | 13 | 68 |

TABLE 3-continued

|  | 8* (HIPS/Acyl) | 9 (KR-04/Acyl) | 10* (HIPS/Epoxy) | 11 (KR-04/Epoxy) |
|---|---|---|---|---|
| Flexural Modulus (Kpsi) | 315 | 290 | 319 | 279 |
| Flexural Yield (Kpsi) | 12.7 | 11.8 | 12.9 | 11.0 |
| Tensile Yield (Kpsi) | 9.0 | 7.6 | 9.2 | 7.7 |
| Tensile Break | 8.0 | 7.2 | 9.0 | 7.1 |
| Flow (inches)[b] | 24.0 | 23.25 | 22.5 | 24.0 |

*Control
[a] = "d" = ductile; "b" = brittle; "ds" = ductile split; measurement is at break-point
HIPS = High Impact Polystyrene
KR-04 = K-Resin ®, grade 04
[b]Flow = Length of melt flow in 0.250 inch × 0.125 inch channel, at 550° F. cylinder (set), 170° F. mold (set), and 10,000 psi into mold.

The data in Table 3 again clearly demonstrate the benefits of this invention, as shown, for example, by the highly improved Izod impact and tensile elongation values, regardless of what compatibilizing agent is used.

While flexural modulus values were decreased somewhat, they are still excellent for most end uses.

Those skilled in the chemical arts recognize that modifications and variations of the present invention are possible in light of the above teachings. It is to be understood, therefore, that changes may be made in particular embodiments described above which are within the full intended scope of the invention as defined by the claims which follow. All of the above-mentioned patents, patent applications, and publications are incorporated herein by reference.

We claim:

1. A thermoplastic composition consisting essentially of
   a) a polyphenylene ether resin;
   b) a polyamide resin;
   c) an effective amount of a compatibilizing agent for components a and b;
   d) a radial block copolymer which comprises about 60% to about 95% by weight polymerized vinyl aromatic material, and about 40% to about 5% by weight polymerized conjugated diene monomer, said copolymer having at least three polymer chains which form the radial configuration; and
   e) an elastomeric material other than radial block copolymer d).

2. The thermoplastic composition of claim 1, wherein the compatibilizing agent is selected from the group consisting of:
   i) compounds which contain both (I) an ethylenic carbon-carbon double bond or a carbon-carbon triple bond and (II) a carboxylic acid, an anhydride, an amide, an imide, an ester, an amine, or a hydroxyl group;
   ii) liquid diene polymers;
   iii) epoxy compounds;
   iv) polycarboxylic acids or derivatives thereof;
   v) oxidized polyolefin waxes;
   vi) compounds containing a functional an acyl functional group;
   vii) polyphenylene ether resins modified with a compound containing an acyl functional group;
   viii) compounds containing an epoxytriazine group; or a polyphenylene ether modified with a compound containing an epoxytriazine group; and
   ix) trialkylamine salts or tri-(aryl-substituted alkyl) amine salts.

3. The thermoplastic composition of claim 2, wherein the compatibilizing agent is selected from the group consisting of citric acid, maleic anhydride, fumaric acid, malic acid, salts of any of the foregoing, and hydrates of any of the foregoing.

4. The thermoplastic composition of claim 1, wherein polymer chains of the radial block copolymer terminate with a substantially non-elastomeric segment.

5. The thermoplastic composition of claim 1, wherein the polyamide resin is a continuous phase and the polyphenylene ether resin is a dispersed phase.

6. The thermoplastic composition of claim 1, wherein the weight ratio of polyphenylene ether resin to polyamide resin is between about 70:30 to about 30:70.

7. The thermoplastic composition of claim 1, wherein the amount of radial block copolymer ranges from about 1% by weight to about 30% by weight, based on the weight of the entire composition.

8. The thermoplastic composition of claim 1, wherein the elastomeric material is selected from the group consisting of styrene-butadiene-styrene block copolymers, styrene-(ethylene-butylene)-styrene block copolymers, and styrene-(ethylene-propylene)-styrene block copolymers.

9. The thermoplastic composition of claim 1 having therein effective amounts of at least one additive selected from the group consisting of flame retardants, plasticizers, stabilizers, antistatic agents, fillers, reinforcing agents, lubricants, colorants, dyes, pigments, and drip retardants.

10. A thermoplastic composition comprising:
    I) a compatibilized blend of a polyphenylene ether resin and a polyamide resin;
    II) a radial block copolymer which comprises about 60% to about 95% by weight polymerized vinyl aromatic material, and about 40% to about 5% by weight polymerized conjugated diene monomer, said copolymer having at least three polymer chains which form the radial configuration; and
    III) an elastomeric material other than radial block copolymer II).

11. The thermoplastic composition of claim 10, wherein the polyamide resin is a continuous phase and the polyphenylene ether resin is a dispersed phase.

* * * * *